(12) United States Patent
Hloben

(10) Patent No.: US 11,730,159 B2
(45) Date of Patent: Aug. 22, 2023

(54) SYSTEMS AND METHODS FOR POWER LINE DETECTION DURING SPRAYING APPLICATION AND BOOM FOLDING

(71) Applicant: DEERE & COMPANY, Moline, IL (US)

(72) Inventor: Peter Hloben, Heidelberg (DE)

(73) Assignee: DEERE & COMPANY, Moline, IL (US)

( * ) Notice: Subject to any disclaimer, the term of this patent is extended or adjusted under 35 U.S.C. 154(b) by 143 days.

(21) Appl. No.: 17/228,781

(22) Filed: Apr. 13, 2021

(65) Prior Publication Data

US 2021/0329905 A1 Oct. 28, 2021

(30) Foreign Application Priority Data

Apr. 22, 2020 (EP) ..................................... 20170912

(51) Int. Cl.
*A01M 7/00* (2006.01)
*G05D 1/00* (2006.01)

(52) U.S. Cl.
CPC ......... *A01M 7/0075* (2013.01); *G05D 1/0094* (2013.01); *G05D 2201/0201* (2013.01)

(58) Field of Classification Search
CPC .............. A01M 7/0075; G05D 1/0094; G05D 2201/0201
See application file for complete search history.

(56) References Cited

U.S. PATENT DOCUMENTS

2004/0195356 A1\* 10/2004 Ellsworth ........... A01M 7/0053
239/166
2011/0153169 A1 6/2011 Peterson
2014/0263766 A1\* 9/2014 Venton-Walters ... A01C 23/047
403/53
2017/0027103 A1 2/2017 Grotelueschen et al.
2018/0110213 A1\* 4/2018 Oberheide .......... A01M 7/0057
2019/0302762 A1 10/2019 Bharatiya et al.

FOREIGN PATENT DOCUMENTS

CN 210054388 U 2/2020
WO WO2008098290 A1 8/2008

OTHER PUBLICATIONS

European Search Report issued in counterpart application No. 20170912.8 dated Sep. 30, 2020 (05 pages).

\* cited by examiner

*Primary Examiner* — Peter D Nolan
*Assistant Examiner* — Roy Rhee

(57) ABSTRACT

An agricultural machine includes a chassis, a center frame mounted for vertical movement, and laterally extendable right and left foldable booms. A sprayer boom controller includes positioning data. A first identification system transmits a predefined frequency radio signal at a first point in time. A second identification system on the right boom and a third identification system on the left boom receive the radio signal. An identification system calculates actual distances between the first and second identification systems and the first and third identification systems based on the wavelength of the radio signal and the differences of the first and second points in time and the first and third points in time. Information regarding the actual distances is transmitted to the sprayer boom controller which compares the calculated distances with the predetermined positioning data and stops folding and/or unfolding in response to determining they exceed or underrun a tolerance value.

16 Claims, 5 Drawing Sheets

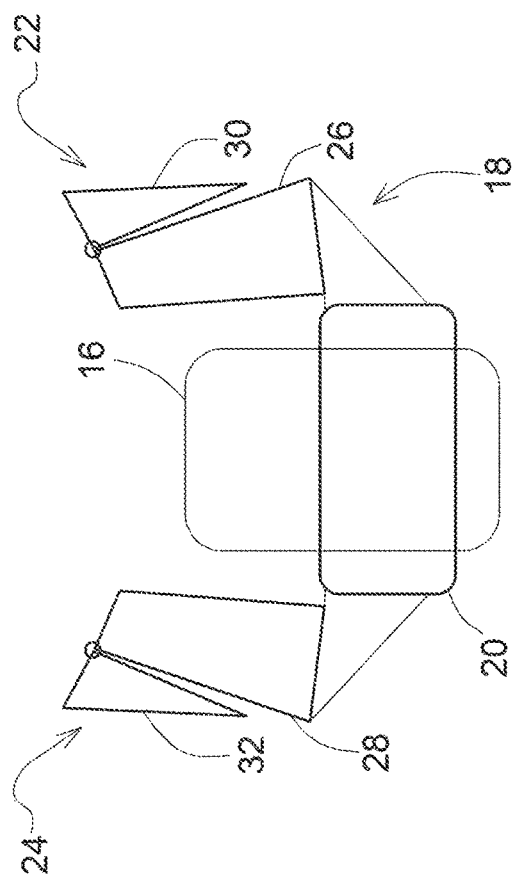
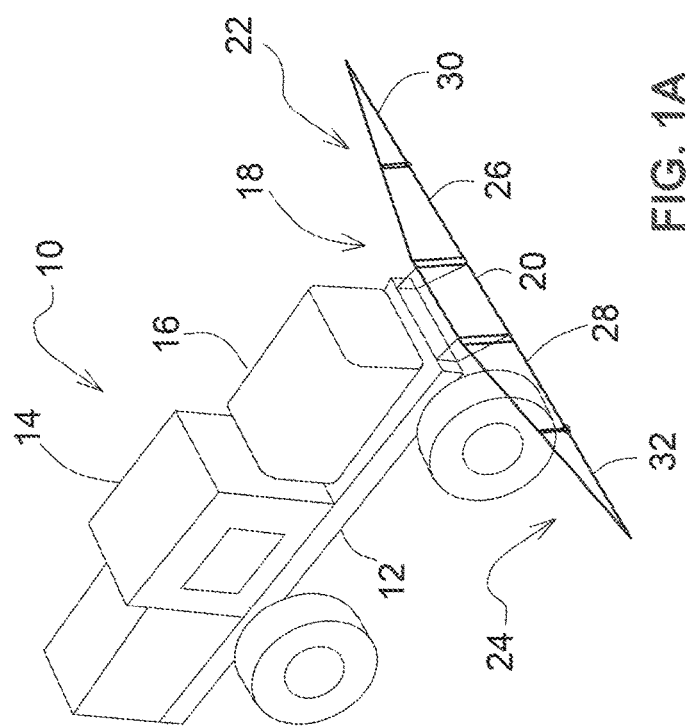
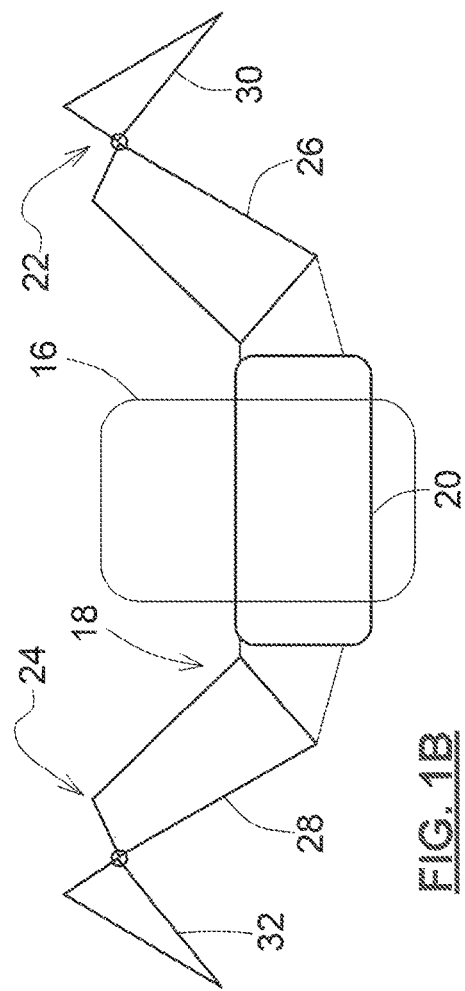
FIG. 1A
FIG. 1B
FIG. 1C

SYSTEMS AND METHODS FOR POWER LINE DETECTION DURING SPRAYING APPLICATION AND BOOM FOLDING

CROSS-REFERENCE TO RELATED APPLICATIONS

This application claims the benefit of European Patent Application No. 20170912.8, filed Apr. 22, 2020. The entire disclosure of the application referenced above is incorporated by reference.

FIELD

The present disclosure relates to agricultural machines, particularly to agricultural sprayers and more particularly to a system and a method of monitoring folding or unfolding of an agricultural sprayer boom assembly mounted on an agricultural sprayer.

BACKGROUND

There are different types of equipment, such as construction equipment, turf care equipment, agricultural equipment, and forestry equipment. Agricultural equipment can include a wide variety of machines such as harvesters, sprayers, and planters to perform wide variety of operations. Some examples of agricultural operations include preparing a field, harvesting a planted material, and applying a fluid or other material to the field. These operations can be operated and controlled by an operator or often by sensors that sense a variety of different variables such as machine operating parameters, field characteristics, environmental parameters, etc.

However, it can be difficult for some current systems to not only obtain accurate and valuable sensed variables, but to also analyze the sensed variables along with other field information to produce meaningful results. For instance, it can be difficult for some current systems to predict and avoid hazardous conditions at the field.

A particular hazardous condition can be present when machinery is operating at the field having overhead, electrical power cables. Overhead power cables can be spread out across the field to transmit high voltage electricity. It can be difficult for an operator to see the power cables from within a cab of the mobile machine, and it can also be difficult to control the machine to avoid contact with the power cables or their supports and/or to keep required safety distance from the power cable when operating the mobile machine on the field. This problem can be aggravated when operating large or bulky machinery.

For instance, agricultural sprayer comprises large booms to enable appropriate application of plant protection products. These booms may be raised in an unfolded position at some height off the ground and must be folded for the transportation of the sprayer on the public roads, between the fields and farm in a very compact way to fulfill the roadway requirements and may require to fold and/or unfold in vertical and/or horizontal direction. Thus, folding the boom may create risk of getting too close to the power cables, support of power cables or any other obstacles. If the boom, or any other part of the agriculture spraying machine for that matter, does not keep a required safety distance to a power cable or its support, it can be very dangerous for both the agriculture spraying machine and its operator.

It can be difficult for an operator to be aware of approaching power cables or to be aware of working in the vicinity of the power cables during or after the period of operation. However, the operator in the cab shall be then protected and warned when the sprayer boom or sections and particularly the tip of the sprayer boom will be folded and/or unfolded in the vicinity to electrical power cables and underrunning a required safety distance. These difficulties can be aggravated because of the complex nature of the operations performed by these machines, including movement over complex terrain and because of environmental conditions at the agricultural fields, as well as difficulty in achieving safe and efficient maneuverability of large machinery.

It would therefore be desirable to provide a system which may detect critical situations as described above and provide preventive measures to avoid such critical or hazardous situations.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An agricultural machine and a method of monitoring folding or unfolding of sprayer booms mounted on the agricultural machine within a sprayer boom assembly is provided. The mentioned agricultural machine may be a self-propelled, trailed or mounted agricultural sprayer. Further the agricultural machine may be an unmanned autonomous vehicle (UAV).

Further, the agricultural machine includes a chassis, a sprayer boom assembly with a center frame mounted for vertical movement on the chassis and laterally extendable right and left foldable and unfoldable booms connected to the center frame. Each right and left boom comprising one or more boom sections, wherein the right or left booms are foldable or unfoldable at least partially in vertical direction.

Moreover, the sprayer boom assembly may be made up of material including composite structures of steel, aluminum, alloys or any lightweight material including fiber, carbon fiber, flax fiber, fiberglass, graphite, polymers, plastics, graphene and combinations thereof. The sprayer booms may be foldable or unfoldable in partly horizontal and in partly vertical direction, or entirely in vertical direction. Folding or unfolding of the sprayer boom may be achieved by hydraulic, pneumatic, electric actuator or any such similar actuation method and may be operable remotely or from the cab according to the need.

Further, the center frame is moveable vertically by a parallel linkage system. Vertical movement of the parallel linkage system may be achieved by hydraulic, pneumatic, electric actuator or any such similar actuation method and may be operable remotely or from the cab according to the need. Actuation of folding or unfolding of the sprayer booms and vertical movement of the center frame may be controlled by a sprayer boom controller based on sprayer boom controller data and/or Global Navigation Satellite System (GNSS)—for example, Global Positioning System (GPS)—data or other location sensor data of the agriculture machine automatically during or after field operation.

The sprayer boom controller includes predetermined positioning data of the sprayer boom assembly. The predetermined positioning data might be provided by a memory, a data store or a data bank connected to or integrated in the sprayer boom controller.

A first identification system is mounted on the agricultural machine or the agricultural sprayer, respectively, at a determinable position to transmit a predefined frequency radio signal at a first point in time.

A second identification system mounted on the right boom and a third identification system mounted on the left boom to receive the radio signal transmitted from the first identification system at a second point in time and a third point in time, respectively.

Further, the identification systems includes one or more of a transmitter, receiver, antenna and controller. The predefined frequency radio signal transmitted by the first identification system is preferably in the range of radio wave spectrum—e.g., in the range of 30 kHz to 300 MHz—but may also include shorter waves such as microwaves or radar waves up to 300 GHz.

Further, the second and third identification systems may be mounted on tips of an outermost right and left boom section, respectively.

An integrated identification system controller is provided to calculate actual distance values between the first and second identification systems and the first and third identification systems based on the wavelength of the radio signal and the differences of the first and second points in time and the first and third points in time, respectively, wherein, information from the integrated identification system controller regarding the actual distances is transmitted to the sprayer boom controller.

The sprayer boom controller compares the calculated actual distance values with the predetermined positioning data, wherein, the predetermined positioning data comprises reference distance values between the first and second identification systems and the first and third identification systems for discrete folding and unfolding positions of the right and left booms.

Moreover, the agricultural machine includes one or more sensors to determine reference distance values with regard to the approach of one or more discrete folding or unfolding positions of the right and left booms or of the one or more boom sections, respectively. The one or more sensors may be any kind of distance or position sensors located on the sprayer boom assembly and configured to sense a discrete folding or unfolding position of the booms or the respective boom sections relative to each other, to the center frame or to the chassis. The one or more sensors may include potentiometers, switches or pressure sensors in interaction with the hydraulic, pneumatic, electric actuators or other moveable components of the sprayer boom assembly. The one or more sensors may further include other sensors such as RADAR, LIDAR, Infra-red, UV ray or any similar radio frequency, light and/or laser-based distance measuring sensors, noise tolerant audio distance measuring sensors and combinations thereof interacting with the moveable components of the sprayer boom assembly. Sensor signals are communicated by wire or over a controller area network (CAN) bus or another network, such as an Ethernet network, or even wireless, e.g. by WiFi etc.

The sprayer boom controller stops folding or unfolding in response to exceeding or underrunning a tolerance value between the calculated actual distance and the reference distance values. Stopping of folding or unfolding will stop any activity or motion of the hydraulic, pneumatic, electric actuators or other moveable components of the sprayer boom assembly.

Moreover, the agricultural machine may include Global Navigation Satellite System (GNSS) which may store positioning data of the agricultural machine at a field location of stopping the folding or unfolding of the sprayer boom assembly.

Further, a method of monitoring the folding or unfolding of the agricultural sprayer boom assembly mounted on the agricultural sprayers is disclosed.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 1A shows a schematic rear side perspective view of an agricultural sprayer with spray booms in fully extended position.

FIG. 1B shows a schematic rear view of the agricultural sprayer of FIG. 1A with the spray booms in a partially folded or unfolded position.

FIG. 1C shows a rear view of the agricultural sprayer of FIG. 1A or FIG. 1B with the spray booms in an upright folded position.

In the drawings, reference numbers may be reused to identify similar and/or identical elements.

DETAILED DESCRIPTION

Figure 2A:
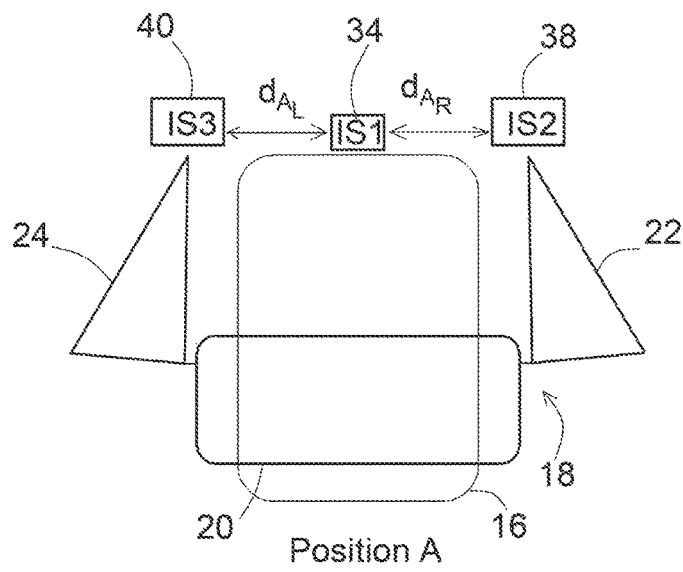
FIG. 2A shows a rear view of another example of an agricultural sprayer with spray booms of one spray boom section in an upright folded position at lowest possible height of a center frame.

Referring now to FIG. 1A, there is shown an agricultural machine such as a self-propelled agricultural sprayer 10. In other implementations, the agricultural machine may be a trailed or a mounted sprayer.

The agricultural sprayer 10 includes a chassis 12 that provides a structure for mounting numerous components associated with the agricultural sprayer 10 thereon. In some implementations, the agricultural sprayer 10 includes a cab 14 which is mounted on the chassis 12. The cab 14 houses a seat for an operator and several controls which may be manipulated by the operator in order to control operations of the agricultural sprayer 10 during performance of a work function such as an agricultural spraying function. In other implementations, the agricultural sprayer 10 may be an unmanned autonomous vehicle (UAV) capable of performing the work function—e.g., spraying—either with or without operator input and/or control.

The agricultural sprayer 10 further includes a storage tank 16 which stores a spray liquid comprising chemicals such as herbicides, pesticides and fertilizers that are to be sprayed on a field. The storage tank 16 is mounted on the chassis 12 at a location which is aft of the cab 14. The agricultural sprayer 10 also includes a spray boom assembly 18 located at a rear position of the agricultural sprayer 10 and operable to distribute the chemicals in the storage tank 16 over a wide area in the field. In particular, the liquid chemicals are distributed by a number of nozzles (not shown), which are spaced along the spray boom assembly 18, through which the liquid chemicals are sprayed as the agricultural sprayer 10 is propelled along the field of crop or plants. In other implementations, the spray boom assembly 18 may be located at different locations on the agricultural sprayer 10 such as at a front end or in a mid-portion of the agricultural sprayer 10.

Further, the spray boom assembly 18, as shown in FIG. 1A is in a fully extended position and includes a center frame 20 mounted for vertical movement on the chassis 12 and laterally extendable right and left foldable and unfoldable booms 22, 24 connected to the center frame 20. Each right and left boom 22, 24 comprising one or more boom sections 26, 28, 30, 32 wherein the right and left booms 22, 24 are foldable or unfoldable in vertical direction. In the fully extended position, the right and left booms 22, 24 are generally positioned in a horizontal orientation, such that the spray boom assembly 18 is substantially parallel to a ground surface. During operation, the spray boom assembly 18 can be moved either automatically or semi-automatically, such as in response to a user input or by controlling hydraulic actuators coupled to the right and left booms 22, 24, such that the booms 22, 24 move through a wide variety of different positions. In one example, in the fully extended position, each of the right and left boom 22, 24 extend in a generally horizontal orientation, generally perpendicular to the direction of travel of the agricultural sprayer 10 and can be moved between the fully extended position and a transport position.

As shown further in FIG. 1B, the spray boom assembly 18 of the agricultural sprayer 10 is in an intermediate position between the fully extended position (FIG. 1A) and the transport position (FIG. 1C). The boom sections 30 and 32 generally indicate outermost portions of the spray boom assembly 18 that are less proximate to the agricultural sprayer 10, relative to the boom sections right and left booms 26, 28, which are more proximate the agricultural sprayer 10. The boom sections 26, 28, 30, 32 can be moved individually. In the example shown in FIG. 1B, to begin moving the spray boom assembly 18 to the transport position (shown in FIG. 1C), the right and left booms 22, 24 are folded and unfolded generally in vertical orientation. In this position, the spray boom assembly 18 extends vertically beyond the height of the agricultural sprayer 10.

Further, FIG. 1C shows the transport position of the spray boom assembly 18. In this position, the right and left booms 22, 24 are completely folded vertically so that they are parallel to each other and in closest position to the agricultural sprayer 10.

FIGS. 1A-1C therefore show one example of how the spray boom assembly 18 can be moved to fold and/or unfold through a series of positions that orient the right and left booms 22, 24 in the most appropriate position for an operation being performed by the agricultural sprayer 10 (e.g., spraying operation vs. transportation operation, etc.). However, sometimes—for example, during reduced daylight visibility or night operations—it can be difficult for an operator sitting in a cab to observe the position of obstacles such as power cables, electric poles/supports, trees or any similar obstacle while folding and/or unfolding the right and left boom 22, 24 (e.g., changing their length, changing their orientation to the agricultural sprayer 10, etc.). For example, an operator might attempt to move the right and left boom 22, 24 between the fully extended position and the transport position when the agricultural sprayer 10 is near overhead power cables. If overhead power cables are not detected, as the right and left boom 22, 24 are folded vertically upwards (for example), they might be at an increased risk of contacting power cables or of coming too close to the power cables beyond a safety distance. Of course, it is noted that other movements of the right and left boom 22, 24 can place the entire spray boom assembly 18 at an increased risk of contacting power cables as well.

Figure 2B:
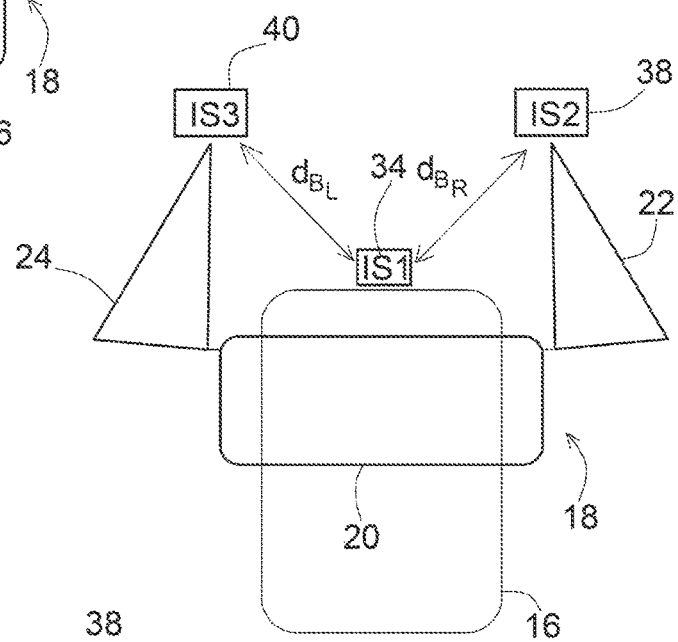
FIG. 2B shows a rear view of the agricultural sprayer of FIG. 2A with the spray booms in the upright folded position at highest possible height of the center frame.
Figure 2C:
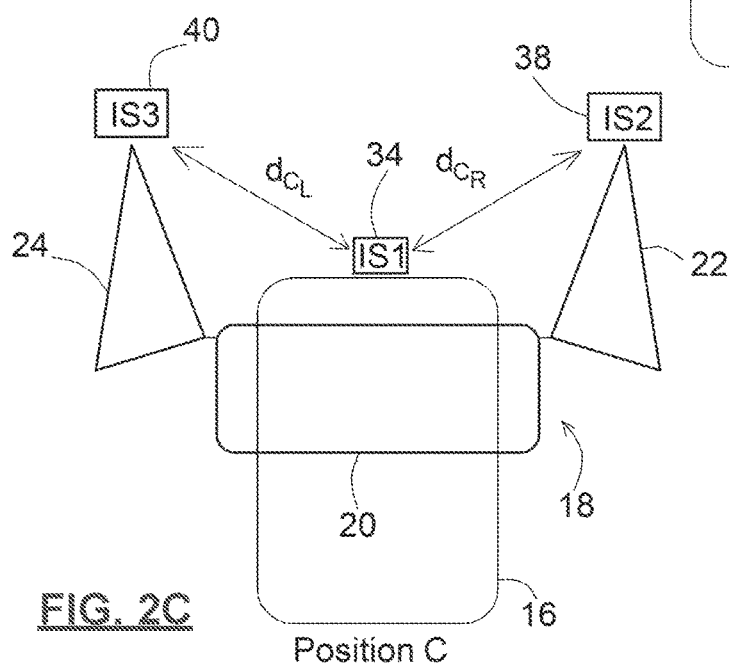
FIG. 2C shows a rear view of the agricultural sprayer of FIG. 2a or FIG. 2B with the spray booms in between upright folded and fully extended positions at highest possible height of the center frame.
Figure 2D:
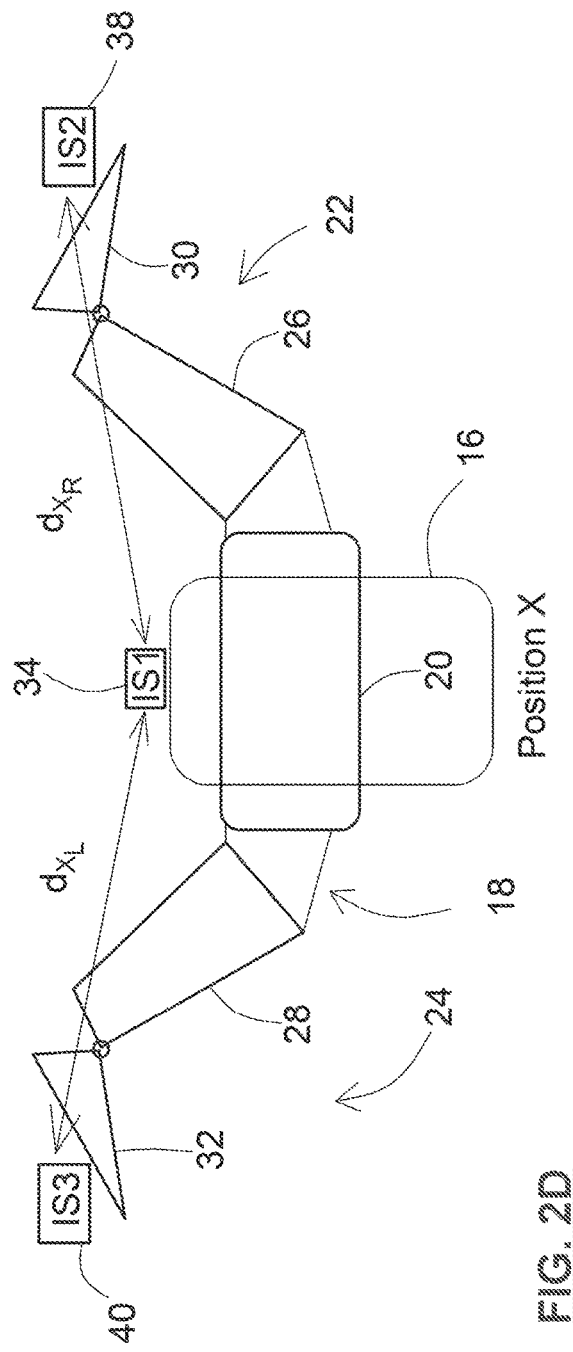
FIG. 2D shows a rear view of another example of an agricultural sprayer with spray booms of two spray boom sections in between upright folded and fully extended positions at highest possible height of a center frame.
Figure 2E:
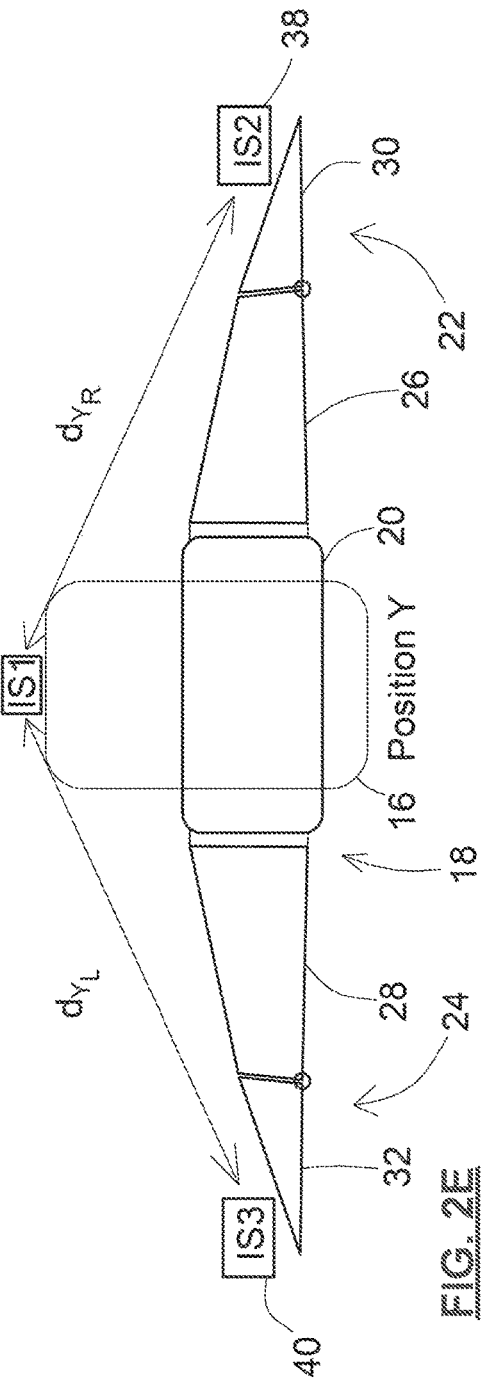
FIG. 2E shows a rear view of the agricultural sprayer of FIG. 2D with the spray booms in fully extended position at lowest possible height of the center frame.

FIGS. 2A-2C show a spray boom assembly with at least one boom sections 22, 24, in vertically lowered (FIG. 2A) and in lifted positions of a center frame 20 (FIGS. 2B and 2C). In FIGS. 2A and 2B, the respective spray boom assemblies 18 are in transport position. Moreover, FIG. 2C shows the spray boom assembly 18 in a vertically lifted position of the center frame 20 with the spray boom assembly 18 in between fully extended and transport position. Further, FIGS. 2D and 2E show a spray boom assembly 18 with multiple boom sections 26, 28, 30, 32, wherein FIG. 2D shows the boom assembly 18 in vertically lifted position of the center frame 20 with the spray boom assembly 18 in between fully extended and transport position. The boom assembly 18 shown in FIG. 2E shows the same in a vertically lowered position of the center frame 20 with the spray boom assembly 18 in fully extended position. As shown in FIGS. 2A-2E, a first identification system 34 is mounted on the agricultural machine 10 at a determinable position to transmit a predefined frequency radio signal 36 at a first point in time. Further, with respect to FIGS. 1A-1C, a second identification system 38 mounted on the right boom 22 and a third identification system 40 mounted on the left boom 24 to receive the same radio signal 36 transmitted from the first identification system 34, wherein the second identification system 38 receives the radio signal at a second point in time and the third identification system 40 receives the signal at a third point in time, respectively. Alternatively, as shown in FIG. 2D-2E, the second identification system 38 and the third identification system 40 may be mounted on the outermost boom sections 30 and 32, with the second identification system 38 receiving the radio signal at a second point in time and the third identification system 40 receiving the signal at a third point in time, respectively. The mounting location of the second identification system 38 and the third identification system 40 may be at the tip of the right and left boom 22, 24 or at the tip of the outermost boom sections 30, 32, respectively.

Figure 3:
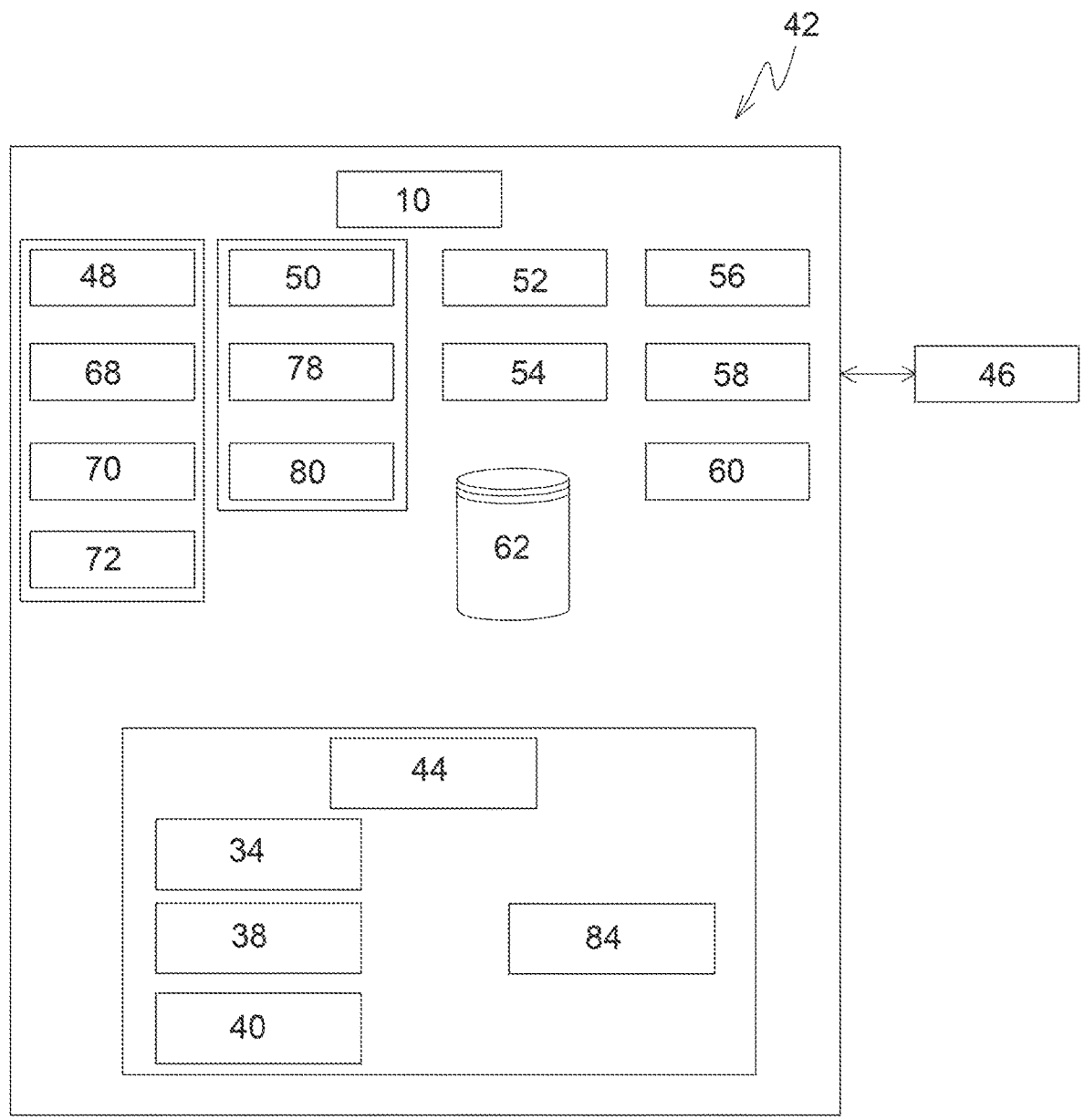
FIG. 3 shows a block diagram of one example of a computing architecture of an agricultural sprayer according to one of the FIGS. 1A to 2E with a boom monitoring system for folding or unfolding of the sprayer booms.

FIG. 3 shows a block diagram of one example of computing architecture 42 that includes a boom monitoring system 44 that can be used on the agricultural sprayer 10. Computing architecture 42 illustratively includes the agricultural sprayer 10 having the boom monitoring system 44 and an operator 46. Prior to discussing features of the boom monitoring system 44 in detail, a brief overview of the computing architecture 42 and the agricultural sprayer 10 will first be provided.

The agricultural sprayer 10 illustratively includes a control system 48, controllable subsystems 50, processor(s) 52, sensor(s) 54, user interface mechanisms 56, user interface logic 58, a positioning system 60 and data store(s) 62.

User interface mechanisms 56 can include one or more display devices, one or more audio devices, one or more haptic feedback devices, and other items, such as a steering wheel, joysticks, pedals, levers, buttons, keypads, etc. In one example, the agricultural sprayer 10 uses user interface logic 58 to detect user interaction with user interface mechanisms 56 and to generate signals indicative of the user interaction. The agricultural sprayer 10 may also use user interface logic 58 to generate outputs on user interface mechanisms 56. For instance, user interface logic 58 can generate operator interface displays having actuators (buttons, icons, etc., not shown) for display on a user interface device and for interaction by the operator 46. Operator 46 can interact with the actuators to control and manipulate the agricultural sprayer 10.

Sensor(s) 54 can generate a wide variety of different sensor signals representing a wide variety of different sensed variables. For instance, sensor(s) 54 can generate signals indicative of slope angle, proximity, acceleration, hydraulic actuator movement or position, and geographic locations (e.g., where sensors 54 include a Global Navigation Satellite System (GNSS)—e.g., a global positioning system (GPS)—receiver or other positioning system. In one implementation, the sensor(s) 54 determine an approach of one or more predetermined discrete folding or unfolding positions (A, B, C, X and Y) of the right and left booms 22, 24 or boom sections 26, 28, 30, 32 and generate a respective signal indicating the same. Furthermore, first, second and third identification systems 34, 38, 40 may be used to determine an actual distance values for discrete position A to be compared with respective reference distance values dAR and dAL (shown in FIG. 2A) of the right and left boom 22, 24 at particular boom position and at particular point in time. Similarly, for other discrete positions (B, C, X and Y) actual distance values for comparison with refence distance values dBR, dBL, dCR, dCL, dXR, dXL, dYR, dYL (shown in FIGS. 2B, 2C, 2D, 2E) at particular boom positions of the right and left booms 22, 24 or boom sections 26, 28, 30, 32 may be determined at particular point in time by first, second and third identification systems 34, 38, 40. According to the discrete folding/unfolding conditions/positions the respective discrete distance values, which are predetermined and stored in the data store(s) 62 for a respective folding/unfolding condition/position, can be read out from the data store(s) 62 and used as reference distance values 66 which then can be compared with the actual distance values delivered by the first, second and third identification systems 34, 38, 40. The sensor(s) 54 may include one or more pressure sensors, angle sensors, optical sensors, proximity sensors, ultrasonic sensors, RADAR, LIDAR, Infra-red, UV ray or any similar radio frequency, light and/or laser-based distance measuring sensors, noise tolerant audio distance measuring sensors and combinations thereof, wherein the sensors 54 are linked to the movement of the booms 22, 24 or boom sections 26, 28, 30, 32 relative to each other and/or to the center frame 20 and/or to the chassis 12 of the agricultural sprayer 10.

Positioning system 60 illustratively generates one or more signals indicative of a position of the agricultural sprayer 10 at any given time during an operation. Generally, the positioning system 60 receives sensor signals from one or more sensor(s) 54, such as a GNSS receiver, or a wide variety of other systems or sensors, to determine a position of the agricultural sprayer 10 across the field. Positioning system 60 can also access data store(s) 62 to retrieve stored positioning information that indicates positions of the agricultural sprayer 10 in performing historical operations, as well as the paths and/or patterns of travel of the agricultural sprayer 10 during performance of the historical operations.

Control system 48 illustratively includes a control signal generator 68, a sprayer boom controller 70 and logic unit 72. Control signal generator 68 and sprayer boom controller 70 generate control signals for controlling a variety of different controllable subsystems 50, based on sensor signals generated by sensors 54 and/or first, second and third identification system 34, 38, 40, based on user inputs received through user interface mechanisms 56 and detected via user interface logic 58, based on positioning information obtained from positioning system 60, and/or based on a wide variety of other ways as well. Also, the sprayer 10 is configured to process the reference distance values 66 for the approach of one or more discrete folding and/or unfolding positions of the right and left booms 22, 24 or of respective boom sections 26, 28, 30, 32 of right and left booms 22, 24 which are stored in the data store(s) 62 as predetermined positioning data 76. For instance, various reference distance values 66, dAR, dAL, dBR, dBL, dCR, dCL, dXR, dXL, dYR, and dYL for various positions of the right and left boom 22, 24 may be determined or preset and stored in data store(s) 62 as predetermined positioning data 76.

Controllable subsystems 50 illustratively include a propulsion and steering system 78, and a boom deployment system 80. The propulsion and steering system 78 generally includes an engine that drives ground engaging wheels or tracks via a powertrain mechanism and steering actuators to control the direction of travel. The boom deployment system 80 generally includes any hydraulic or other actuator mechanisms that control movement of the spray boom assembly 18 between the fully extended position and the transport position and/or between the positions A, B, C, X and Y, respectively. For instance, the boom deployment system 80 can drive movement of the right and left boom 22, 24 or of respective boom sections 26, 28, 30, 32 of right and left booms 22, 24 through various positions—e.g., as shown in FIGS. 1A-1C and 2A-2E.

The boom monitoring system 44 includes the first identification system 34, the second identification system 38, the third identification system 40, and an identification system controller 84. The first identification system 34 is mounted on the agricultural machine 10 at a determinable position to create (generate) and transmit a predefined frequency radio signal 36 at a first point in time. The second identification system 38 is mounted on the right boom 22 and the third identification system 40 is mounted on the left boom 24. The second identification system 38 is configured to receive the radio signal 36 (transmitted from the first identification system 34) at a second point in time. The third identification system 40 is configured to receive the radio signal 36 (transmitted from the first identification system 34) at a third point in time.

The predefined frequency radio signal 36 transmitted by the first identification system 34 is in the range of radio wave spectrum—e.g., in the range of 30 kHz to 300 MHz. The integrated identification system controller 84 is configured to calculate actual distance values between the first and second identification systems 34, 38 and the first and third identification systems 34, 40 based on the wavelength of the radio signal 36 and the differences of the first and second points in time and the first and third points in time, respectively. The information of the actual distance values calculated by the integrated identification system controller 84 is transmitted to the sprayer boom controller 70. Further, the sprayer boom controller 70 and the logic unit 72 are configured to compare the calculated actual distance values with the predetermined positioning data 76 which are stored in data store(s) 62. The predetermined positioning data 76 comprise reference distance values 66 at predetermined discrete boom positions A, B, C, X and Y for the distances between the first and second identification systems 34, 38 and the first and third identification systems 34, 40, respectively, at predetermined discrete folding and unfolding positions for the right and left booms 22, 24, or for respective boom sections 26, 28, 30, 32 of right and left booms 22, 24. The sprayer boom controller 70 is further configured to stop folding and/or unfolding of the laterally extending right and left booms 22, 24 or of respective boom sections 26, 28, 30, 32 of right and left booms 22, 24 in case of exceeding or underrunning a tolerance value between the calculated actual distance value and the respective reference distance value 66. Alternatively, instead of stopping folding or unfolding, an alert or alarm signal can be sent out to warn the operator. For example, in case of folding and or unfolding operations in the vicinity of overhead electrical power cables, an approach of the identification system 34 or 38 to the electrical power cables will create an interference of the radio signal caused by the electromagnetic radiance of the electrical field of the power cables. This interference will create radial differential signals or error signals which are not in the range of/aligned with the tolerance values, e.g. exceeding or underrunning the tolerance value between a calculated actual distance and a reference distance value 66. In such a case the sprayer boom controller 70 would detect that the calculated actual distance values are out of tolerance and would immediately stop the operation of the boom, respectively any folding and/or unfolding of the right and left booms 22, 24.

For example, with reference to the following Table 1 the reference distance values 66 (indicated as columns left/right Reference Value) are predetermined and listed for discrete boom positions A, B, C, X and Y (indicated as column Boom Position). As shown, Table 1 shows only a selection of exemplary references for boom positions as shown in FIGS. 2A, 2B, 2C, 2D and 2E. Table 1 is stored in data store(s) 62 with the reference distance values 66 for discrete boom positions A to Y for the left and the right booms 22, 24 and the boom sections 26, 28, 30, 32 of the boom assembly 18. Furthermore, in the column indicated as Tolerance Value, a respective tolerance value is given within which a calculated actual distance value is allowed to differ from a respective reference distance value 66 without the sprayer boom controller 70 being activated to stop folding/unfolding of the boom assembly 18. In other words, as long as the calculated actual distances do not differ from the respective reference distance values 66 more than the respectively given tolerance values, the sprayer boom controller 70 would determine an allowable operation status and would operate folding/unfolding of the boom assembly 18 without any interruption. In the example shown in Table 1 the calculated actual distance values for the boom positions A to X are for the left and right booms within the range of the respective reference distance values 66 plus/minus their respective tolerance value. The sprayer boom controller 70 would therefore detect and indicate an operation status of "OK". Not so for the boom position Y, where the respective reference distance value 66 for the left boom is out of the range of the respective reference distance value 66 plus/minus its respective tolerance value, as indicated in the Table 1 for position Y and the calculated Left Actual Distance Value, where the difference between the left Reference Value (reference distance value for the left boom at position Y) and the Calculated Left Actual Distance equals to 2.5 m and is therefore exceeding the Tolerance Value, which is predetermined as +/−0.5 m. The sprayer boom controller 70 would therefore detect and indicate an operation status of "NOT OK STOP" and immediately stop the folding/unfolding operation of the boom assembly 18.

TABLE 1

| Boom Position | d left Reference Value (m) | d right Reference Value (m) | Tolerance Value (m) | Calculated Left Actual Distance Value (m) | Calculated Right Actual Distance Value | Operation Status |
|---|---|---|---|---|---|---|
| Position A | $d_{A_L}$: 5.5 | $d_{A_R}$: 5.5 | +/−0.5 | 5.5 | 5.5 | OK |
| Position B | $d_{B_L}$: 6.5 | $d_{B_R}$: 6.5 | +/−0.5 | 6.5 | 6.5 | OK |
| Position C | $d_{C_L}$: 9.5 | $d_{C_R}$: 9.5 | +/−0.5 | 9.5 | 9.5 | OK |
| Position X | $d_{X_L}$: 15.0 | $d_{X_R}$: 15.0 | +/−0.5 | 15.5 | 15.5 | OK |
| Position Y | $d_{Y_L}$: 22.5 | $d_{Y_R}$: 22.5 | +/−0.5 | 20.5 | 22.5 | NOT OK → STOP |

Further, the sprayer boom controller 70 may use data of the positioning system 60 to monitor the position of the agricultural machine 10 during operation and link the calculated positioning data of the agricultural machine 10 as shown in Table 1 to a respective field location in which stopping the fold and/or unfold of the sprayer boom assembly 18 has been detected. This could be of benefit for future operations where the positioning data of the agricultural machine 10 which has been stored in data store(s) 62 may be used to avoid operations in such locations. For example, if a "NOT OK STOP" status has been detected for a particular field location in a particular field in which the agricultural vehicle 10 has been operated in the past already the sprayer boom controller 70 would preventatively deactivate folding and unfolding of the boom.

Figure 4:
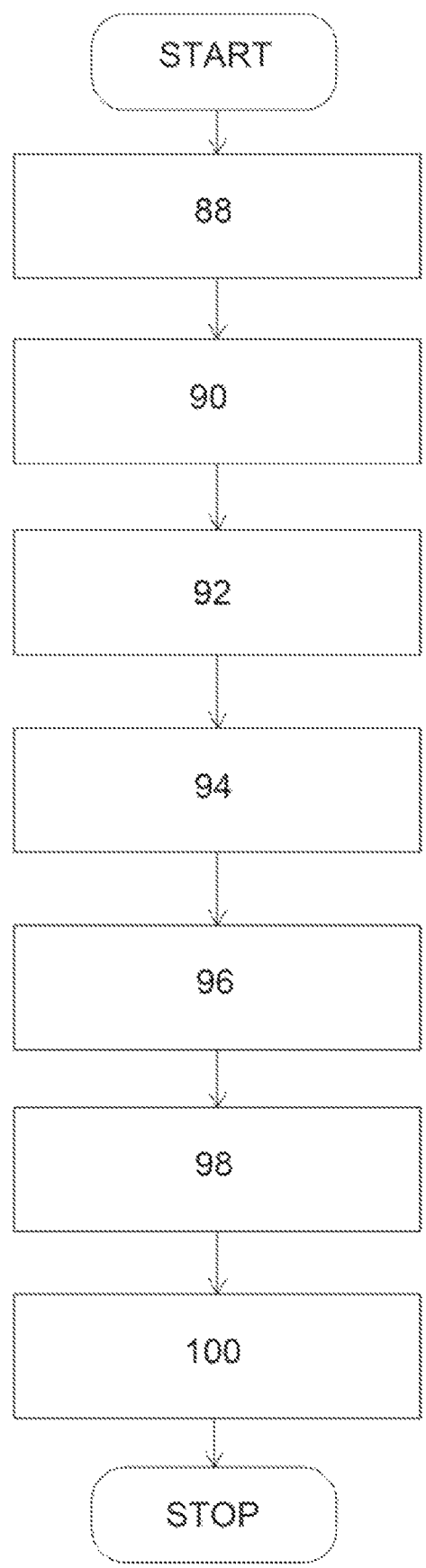
FIG. 4 shows a flow diagram of one exemplary operation of the boom monitoring system according FIG. 3.

Further FIG. 4 shows a flow diagram of one exemplary operation of the boom monitoring system 44 discussed with respect to the FIGS. 1-3.

At block 88, the sprayer boom controller 70 uses predetermined positioning data 76 stored in the data store(s) 62 in order to detect the approach of one or more discrete folding and/or unfolding positions of the right and left booms 22, 24 at discrete points in time.

At block 90, the first identification system 34 mounted on the agricultural machine 10 at a determinable position transmits a predefined frequency radio signal 36 at a first point in time during sprayer boom folding and/or unfolding.

At block 92, the second identification system 38 mounted on the right boom 22 and the third identification system 40 mounted on the left boom 24 receive the same radio signal 36 transmitted from the first identification system 34 at a second and third point in time respectively during the sprayer boom folding and/or unfolding.

At block 94, the integrated identification system controller 84 calculates actual distances between the first and second identification systems 34, 38, and the first and third identification systems 34, 40, respectively, based on the wavelength of the radio signal 36 and the differences of the first and second points in time and the first and third points in time, respectively.

At block 96, the information regarding the actual distances is transmitted from the integrated identification system controller 84 to the sprayer boom controller 70.

At block 98, the sprayer boom controller 70 compares the calculated actual distance values with the predetermined positioning data 76 stored in data store(s) 62 with the help of logic unit 72. The predetermined positioning data 76 comprise the reference distance values 66 between the first and second identification systems 34, 38, and the first and third identification systems 34, 40, respectively, for discrete folding and unfolding positions of the right and left booms 22, 24.

At block 100, the sprayer boom controller 70 may stop folding and/or unfolding of the right and left booms 22, 24 in case of exceeding or underrunning the tolerance value between the calculated actual distance values and the reference distance values 66.

Also, present boom monitoring system can be deployed in a handheld or mobile computing device that can be used as a user's or client's handheld device. For instance, a mobile device such as tablet computer, smart phone can be deployed in computing architecture 42 in the operator compartment of agricultural sprayer 10 for use in generating, processing, or displaying the information discussed herein and in generating a control interface.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the implementations are described above as having certain features, any one or more of those features described with respect to any implementation of the disclosure can be implemented in and/or combined with features of any of the other implementation, even if that combination is not explicitly described. In other words, the described implementations are not mutually exclusive, and permutations of one or more implementations with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

What is claimed is:

1. An agricultural machine comprising:
a chassis;
a sprayer boom assembly with a center frame mounted for vertical movement on the chassis and laterally extendable right and left foldable and unfoldable booms connected to the center frame, each right and left boom includes one or more boom sections, wherein the right or left booms are foldable or unfoldable in a vertical direction;
a sprayer boom controller that includes predetermined positioning data of the sprayer boom assembly;
a first identification system mounted on the agricultural machine at a determinable position that transmits a predefined frequency radio signal at a first point in time;
a second identification system mounted on the right boom that receives the radio signal transmitted from the first identification system at a second point in time;
a third identification system mounted on the left boom that receives the radio signal transmitted from the first identification system at a third point in time; and
an integrated identification system controller that calculates actual distances between (i) the first and second identification systems based on a wavelength of the radio signal and a difference of the first and second points in time and (ii) the first and third identification systems based on the wavelength of the radio signal and a difference of the first and third points in time,
wherein, information from the integrated identification system controller regarding the actual distances is transmitted to the sprayer boom controller,
wherein, the sprayer boom controller is configured to compare the calculated actual distance values with the predetermined positioning data,
wherein, the predetermined positioning data includes reference distance values between the first and second identification systems and the first and third identification systems for discrete folding and unfolding positions of the right and left booms, and
wherein, the sprayer boom controller is configured to stop folding and/or unfolding in response to exceeding or underrunning a tolerance value between the calculated actual distance and the reference distance values.

2. The agricultural machine of claim 1, wherein the center frame is moveable vertically by a parallel linkage system.

3. The agricultural machine of claim 1, wherein the second identification system is mounted on a tip of an outermost right boom section and the third identification system is mounted on a tip of an outermost left boom section.

4. The agricultural machine of claim 1, comprising one or more sensors to determine the approach of one or more discrete folding or unfolding positions of the right and left booms.

5. The agricultural machine of claim 1, wherein the identification system includes a transmitter, a receiver, an antenna, a controller, or a battery.

6. The agricultural machine of claim 1, wherein the predefined frequency of radio signal is in the range of radio wave spectrum.

7. The agricultural machine of claim 1, wherein the agricultural machine is a self-propelled or trailed agricultural sprayer.

8. The agricultural machine of claim 1, wherein the agricultural machine is an unmanned autonomous vehicle.

9. A method of monitoring folding or unfolding of a sprayer boom assembly mounted on an agricultural machine, wherein the agricultural machine includes a chassis; the sprayer boom assembly with a center frame mounted for vertical movement on the chassis and laterally extendable right and left foldable and unfoldable booms connected to the center frame, each right and left boom comprising one or more boom sections, wherein the right or left booms are foldable or unfoldable in a vertical direction; a sprayer boom controller; a first identification system mounted on the agricultural machine at a determinable position to transmit a predefined frequency radio signal; a second identification system mounted on the right boom to receive the radio signal transmitted from the first identification system; and a third identification system mounted on the left boom to receive the radio signal transmitted from the first identification system, the method comprising:

storing predetermined positioning data of the sprayer boom assembly for discrete folding and unfolding positions of the right and left booms as reference distance values in the sprayer boom controller;
  transmitting the predefined frequency radio signal from the first identification system at a first point in time during folding or unfolding of the sprayer boom;
  receiving, by the second identification system during folding or unfolding of the sprayer boom, the predefined radio frequency signal transmitted from the first identification system at a second point in time;
  receiving, by the third identification system during folding or unfolding of the sprayer boom, the predefined radio frequency signal transmitted from the first identification system at a third point in time;
  calculating, using an integrated identification system controller, actual distance values between (i) the first and second identification systems based on a wavelength of the predefined radio frequency signal and a difference between the first and second points in time and (ii) the first and third identification systems based on the wavelength of the predefined radio frequency signal and a difference between the first and third points in time;
  transmitting information regarding the actual distance values from the integrated identification system controller to the sprayer boom controller;
  comparing, by the sprayer boom controller, the actual distance values with the predetermined positioning data, wherein the predetermined positioning data includes reference distance values between the first and second identification systems and the first and third identification systems for discrete folding and unfolding positions of the right and left booms; and
  stopping, via the sprayer boom controller, folding or unfolding of the sprayer boom assembly in response to exceeding or underrunning a tolerance value between the calculated actual distance and the reference distance values.

10. The method of claim 9, wherein the receiving, calculating, and comparing are performed in response to the sprayer boom assembly approaching a predetermined discrete folding or unfolding position.

11. The method of claim 9, wherein the receiving, calculating, and comparing are performed in response to either the left boom or right boom approaching a predetermined discrete folding or unfolding position.

12. The method of claim 9, wherein the agricultural machine includes a positioning system, the method further comprising storing positioning data of the agricultural machine at a field location in response to stopping the folding or unfolding of the sprayer boom assembly.

13. The method of claim 9, wherein the agricultural machine is a self-propelled or trailed agricultural sprayer.

14. The method of claim 9, wherein the agricultural machine is an unmanned autonomous vehicle.

15. The method of claim 10, wherein the transmitting the predefined frequency radio signal from the first identification system is performed in response to the sprayer boom assembly approaching a predetermined discrete folding or unfolding position.

16. The method of claim 11, wherein the transmitting the predefined frequency radio signal from the first identification system is performed in response to either the left boom or right boom approaching a predetermined discrete folding or unfolding position.

* * * * *